Sept. 12, 1933.  M. W. WOOD  1,926,473
HEATING STOVE
Filed April 6, 1931 2 Sheets-Sheet 1
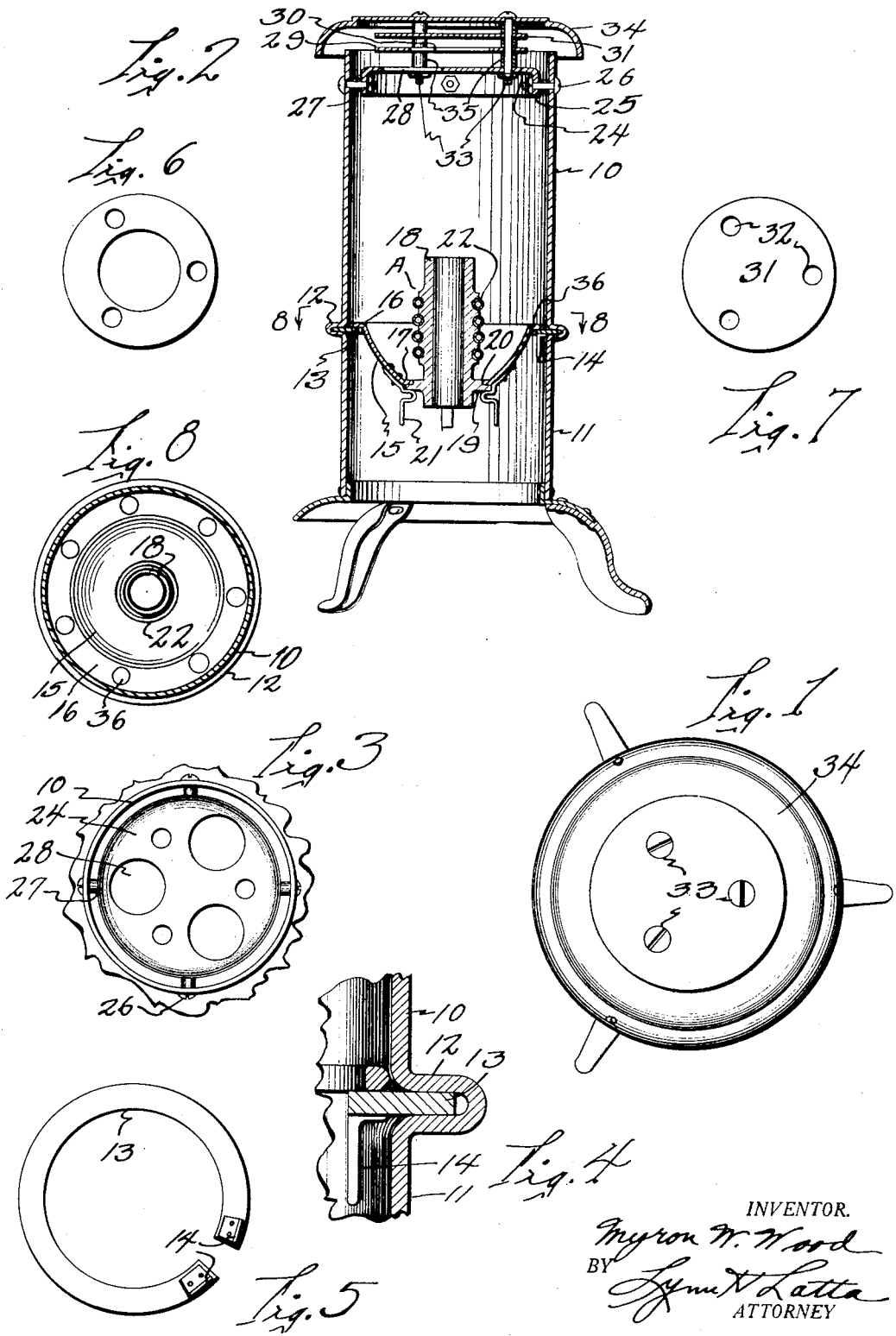

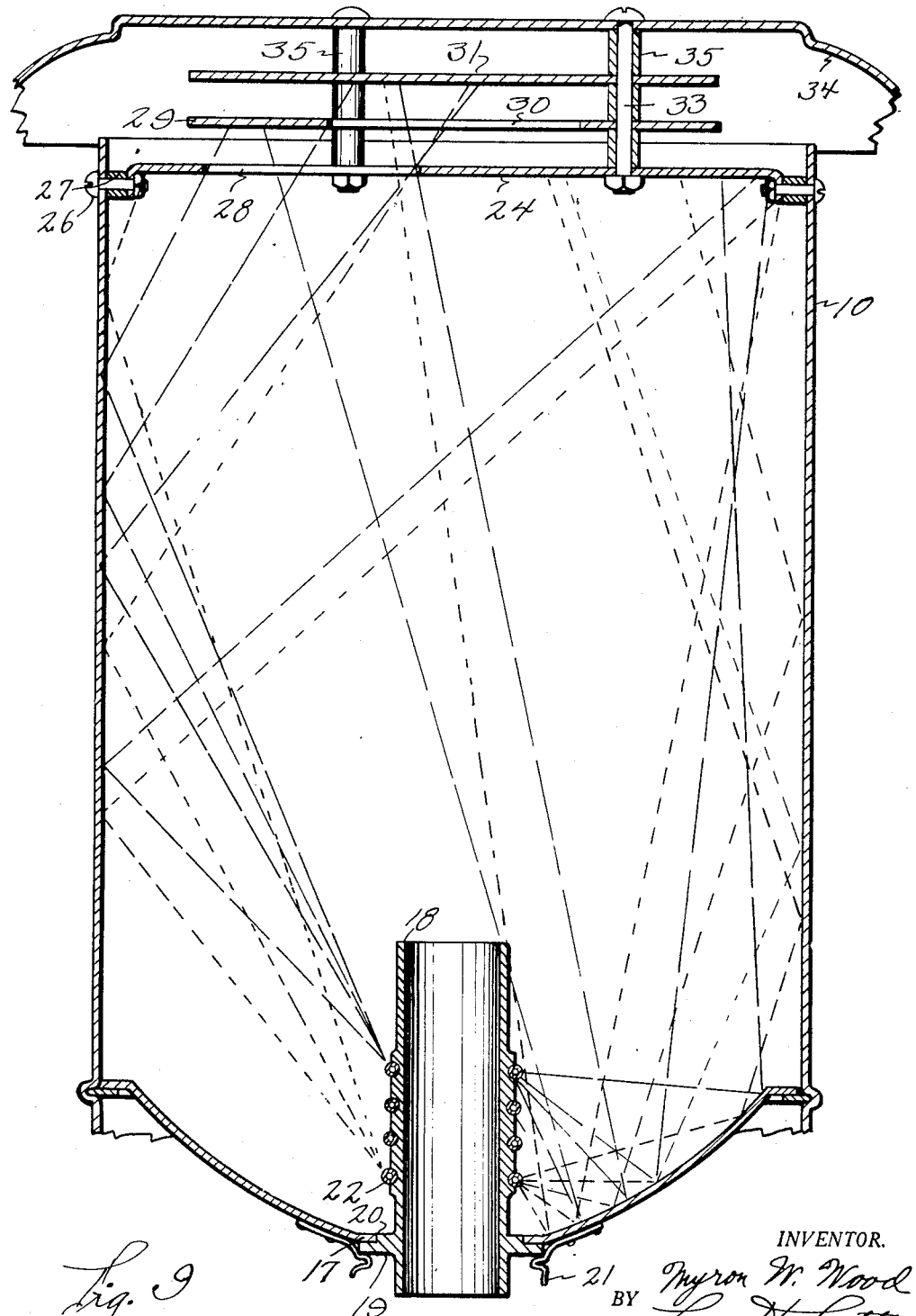

Patented Sept. 12, 1933

1,926,473

UNITED STATES PATENT OFFICE 1,926,473

HEATING STOVE

Myron W. Wood, Corpus Christi, Tex., assignor of one-half to Clarence E. Dunlap, Sioux City, Iowa Application April 6, 1931. Serial No. 527,970

4 Claims. (Cl. 219—34)

My invention relates to electric heaters and has as its object to provide a heater adapted to transform a much higher percentage of the energy of an electric current into heat than has been accomplished in prior heaters.

The efficiency of the ordinary exposed coil, parabolic reflector type electric heater in common use is quite low due to the dissipation of a substantial percentage of the heat rays produced in regions where the heating effect is not utilized to best advantage and to the dissipation of a substantial percentage of the energy put into the heater by the electric current in the form of light rays.

The purpose of the present invention is to make available this dissipated energy in the form of usable heat.

A further object of my invention is to provide an electric heater adapted to transform the radiant heat from the heating element into heated convection currents of air and into radiant heat of a more usable form.

A further object of my invention is to provide an electric heater in the form of a heating stove which will concentrate its heat in the space surrounding the stove on all sides instead of throwing the heat to a distance.

A further object of my invention is to provide the foregoing features in an electric heater which is of simple, durable, inexpensive and compact construction.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a plan view of the heater,

Figure 2 is a vertical, central, sectional view through the heater,

Figure 3 is a detail, plan view of the heater with the cover and conduction plates removed, Figure 4 is an enlarged, detail view of a portion of Figure 2, Figure 5 is a plan view of the reflector supporting ring, Figure 6 is a plan view of the intermediate conduction plate, Figure 7 is a plan view of the upper conduction plate, Figure 8 is a horizontal, sectional view taken on the line 8—8 of Figure 2, and Figure 9 is an enlarged, detail, sectional view taken vertically through the heater.

The heating stove of my invention embodies a stove housing 10 preferably cylindrical in shape, including a skirt portion 11 separated from the upper portion of the housing by a bead 12.

The upper portion of the housing forms a ray concentrating chamber, the heating element A being supported at the lower extremity thereof on a split ring 13 received in the bead 12. The split ring 13 is provided with handles 14 by means of which it may be compressed sufficient to allow withdrawal from the bead, whereby the heating unit A may be removed downwardly through the skirt 11 without disturbing the conduction plate assembly at the upper end of the stove.

The heating unit A includes the reflector 15 having the annular flange 16 resting upon the ring 13 and axially perforated and provided with an inner flange 17 to receive the heating element core 18.

The core 18 is provided with a flange 19 which rests against the lower surface of the flange 17 and an annular shoulder 20 formed on the flange 19 which is received within the axial opening of the reflector and which has an edge to edge contact with the flange 17.

Spring clips 21 secured to the reflector 15 serve to secure and support the core 18 in the reflector.

The heating element 22 is of any conventional construction, such as a helical coil of resistance wire wound helically upon the core 18.

The core 18 is hollow to allow air to pass upwardly therethrough.

The inner surfaces of the reflector 15 and the housing 10 are coated with a suitable, smooth, shiny, coating of proper material to secure the desired reflecting properties, such as nickel. The radiant heat from the heating element will thus be largely reflected and focused upwardly upon the conduction group which will now be described.

The conduction group includes a plurality of apertured plates positioned one above the other so as to collectively absorb all of the heat rays from the upwardly focused beam of heat, while allowing free circulation of air.

The lower conduction plate 24 (Figures 2 and 3) is provided with an annular down-turned flange 25 which is secured to and spaced from the housing wall 10 by means of bolts 26 and spacing sleeves 27.

A series of openings 28 of relatively large diameter are provided in the plate 24 to allow air to pass upwardly therethrough.

The intermediate conduction plate 29 is shown in Figure 6, and is provided with one large, central opening 30 which partially overlaps the openings 28.

The upper conduction plate 31 is imperforate save for the holes 32 to receive the support bolts 33, and catches those rays which pass through both the openings 28 and 30.

The purpose of the plate 31 is to intercept the heat rays so that they do not impinge directly against the hood 34 supported above the plate 31. The hood 34 is thus protected against discoloration from overheating.

The plates 29 and 31 and the hood 34 are supported in respectively superimposed relation above the plate 24 by series of washers 35, and are secured together with the plate 24 into a rigid assembly by means of the bolts 33 which extend through the washers 35.

The flange 16 of the reflector 15 is perforated as at 36.

It will now be seen that air may pass upwardly through the perforations 36 and through the core 18, thence through the openings 28 and 30 and thence through the space between the hood 34 and the top of the housing 10, being spread in all directions by the hood 34 so as to distribute heat from the stove uniformly into the surrounding atmosphere.

It may be noted further that the heating element is inclosed on all sides by the various parts of the stove including the reflector 15, the housing 10, and the conduction plate group.

Thus it is impossible for any of the rays of heat or light emanating from the heating element to pass into the atmosphere beyond the stove but they will all be reflected or intercepted by the inclosing walls of the stove.

It has been noted previously that the inner surfaces of the wall 10 and the reflector 15 are coated with reflecting coatings or are finished so as to constitute reflecting surfaces.

The air will be heated to some extent as it passes through the core 19, but it will be noted that no air currents come in contact with the element coils to deaden their glow.

As a consequence, the heat rays and light rays will be centered upon the conduction group.

The lower faces of the conduction plates are finished in black or with a rough finish suitable for absorbing the heat and light rays without any substantial reflection thereof. As a consequence, the concentrated heat and light rays will raise the temperature of the conducting group to a sufficiently high level so that a large percentage of the heat will be transferred to the air currents passing therethrough by conduction.

Some of the heat generated in the conduction group by the radiant heat from below will be again distributed into the surrounding atmosphere as radiant heat but at a lower wave length and in greater volume. To be more explicit, instead of higher frequency heat waves and light waves representing relatively high temperatures, the heat radiated from the hood will be lower in the invisible spectrum and entirely removed from the visible spectrum, being thus in larger volume although of less intensity as compared with the heat rays bombarding the conduction group.

These lower intensity heat rays will not travel as far as would the heat rays from the heating element were they allowed to escape, and consequently will be employed, as well as the convection currents of heated air, in heating the atmosphere around the heater.

The ordinary reflector type heater loses efficiency by throwing the heat to a great distance without affecting materially the immediately surrounding atmosphere. Inasmuch as an electric heater finds its sphere of usefulness mainly in very localized regions, and is economically unsuitable for the heating of an entire dwelling or even an entire room, this is a very serious objection.

The majority of the heat given off by a reflector type heater is radiant heat. The majority of the heat given off by my heating stove is in the form of heated convection currents and the remainder is in the form of heat rays having a lower intensity and a more localized heating effect.

In other words, the heater may be compared, in its heating effect, to an ordinary heating radiator of the type employed in dwellings and office buildings in connection with hot water or steam heating systems.

On the other hand, the reflector type heater throws a beam of radiant heat which has very little heating effect upon the atmosphere through which it passes. Quite a substantial percentage of the radiant energy is dissipated in the form of light. The heating effect will be mainly concentrated on the surface impinged upon by the heat rays, and if this surface happens to be a wall of the room, the heating effect will be practically wasted, since as much of the heat is apt to be dissipated beyond the wall of the room as is thrown back into the room.

The radiant heat rays must strike an opaque object before they are converted into useful heat. Where the ordinary reflector type heater is employed in supplementing the ordinary furnace or heating system of a dwelling, it must be focused directly upon the body in order that its heating effect may be felt. This type of heating is not particularly beneficial or comfortable to the human body inasmuch as those areas upon which the beam of radiant heat falls will be overheated to the exclusion of those areas which are in the shadow of the beam or beyond its radiance.

The heater of my invention transforms most of the radiant heat into convection currents and localizes the heat in raising the temperature of the atmosphere in the region of the heater.

The greater volume of radiant heat is accounted for by the much greater area of the hood and the conduction plates, giving off heat at a lower intensity than that of the heating element, but in greater volume.

The plates, being metallic, transform the radiant heat into molecular heat and thence conduct it rapidly to the air currents passing thereby.

The heating element is positioned generally at the focus of the reflector 15, although extending axially therethrough.

This heater is what is known as a circulator heater, drawing the cold air from the floor and throwing the heated air out into the room.

Figure 9 illustrates how the rays of heat and light will be reflected upwardly and focused upon the conduction plates, and how some of the rays will pass through the lower plates and strike the upper. On the lefthand side of Figure 9, is illustrated the path of direct rays from the heating element reflected only by the heater housing and on the righthand side of Figure 9, is illustrated the path of rays which are reflected by the reflector 15.

It will be understood that the principle of this invention may be embodied also in a heater using as its source of heat an incandescent gas mantle, which obtains a very high efficiency of combustion, and inasmuch as my stove is adapted to obtain the highest efficiency of heating from an incandescent heating element, many of the advantages of the invention will be present also in this type of heater.

I have demonstrated the efficiency of the heater in the production of useful heat and have been surprised at the results obtained. The plates of the conducting group will become almost red-hot, and a very appreciable current of air will travel through the heater, spreading a current of warmed air in all directions from the heater.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. In an electric heating stove, an upright housing, a heat reflector mounted therein near its lower end on a vertical axis, a heating element positioned generally at the focus of said reflector, a plurality of spaced, superimposed conduction plates mounted at the upper end of the heater to intercept the focused heat rays from said reflector, a lower plate being perforated and an upper plate being adapted to intercept all rays passing through the perforation of the lower plate, said plates being adapted to transform the radiant heat thus intercepted into molecular heat and to thence conduct the same into the atmosphere therearound.

2. In an electric heating stove, an upright cylindrical housing including a reflecting medium on its inner face, a heat reflector mounted therein near its lower end on a vertical axis, a heating element positioned generally at the focus of said reflector, a plurality of spaced, superimposed conduction plates mounted at the upper end of the heater to intercept the focused heat rays from said reflector, a lower plate being perforated and an upper plate being adapted to intercept all rays passing through the perforation of the lower plate, said plates being adapted to transform the radiant heat thus intercepted into molecular heat and to thence conduct the same into the atmosphere therearound.

3. In an electric heating stove, an upright cylindrical housing including on its inner face a reflecting medium, a heat reflector mounted therein near its lower end on a vertical axis, a heating element positioned generally at the focus of said reflector, a plurality of spaced, superimposed conduction plates mounted at the upper end of the heater to intercept the focused heat rays from the said reflector, a plurality of the lower plates being perforated and an upper plate being adapted to intercept all rays passing through the perforations of the lower plates, all of said plates being adapted to transform the radiant heat thus intercepted into molecular heat and to thence conduct the same into the atmosphere therearound.

4. In an electric heating stove, an upright cylindrical housing including a reflecting medium on its inner surface, a heat reflector mounted therein near its lower end on a vertical axis, a plurality of superimposed and perforate conduction plates mounted at the upper end of the heater, rays from the heating element being reflected from the heat reflector to the inner cylindrical reflecting medium, thence to the conduction plates, said plates being adapted to transform the radiant heat thus intercepted into molecular heat and thus to conduct the same into the atmosphere therearound.

MYRON W. WOOD.